United States Patent [19]

Edmondson

[11] 4,061,850

[45] Dec. 6, 1977

[54] EMULSION POLYMERIZATION OF CHLOROPRENE IN THE PRESENCE OF A POLYSULFIDE MODIFIER

[75] Inventor: Morris S. Edmondson, Alvin, Tex.

[73] Assignee: Petro-Tex Chemical Corporation, Houston, Tex.

[21] Appl. No.: 605,309

[22] Filed: Aug. 18, 1975

Related U.S. Application Data

[60] Division of Ser. No. 541,237, Jan. 15, 1975, Pat. No. 3,923,763, which is a continuation-in-part of Ser. No. 289,521, Sept. 15, 1972, abandoned.

[51] Int. Cl.$^2$ .................. C08F 2/00; C08F 34/00; C08F 36/18; C08F 236/18
[52] U.S. Cl. ................ 526/220; 526/223; 526/224; 526/295
[58] Field of Search .......................... 526/220

[56] References Cited

U.S. PATENT DOCUMENTS

| | | | |
|---|---|---|---|
| 1,950,439 | 3/1934 | Carothers | 526/220 |
| 2,264,173 | 11/1941 | Collins | 526/295 |
| 2,396,997 | 4/1945 | Fryling | 526/220 |
| 3,190,865 | 6/1965 | Miller | 526/295 |

Primary Examiner—Herbert J. Lilling

Attorney, Agent, or Firm—Kenneth H. Johnson

[57] ABSTRACT

Chloroprene is polymerized in the presence of compounds of the formula

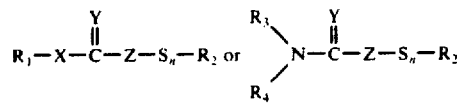

where X, Y and Z are selected from the group consisting of oxygen and sulfur, $R_1$ is a hydrocarbon radical having from 1 to 8 carbon atoms, $R_2$ is a hydrocarbon radical having from 1 to 8 carbon atoms or is a radical the same as

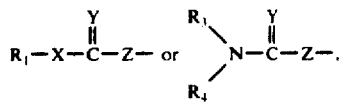

$R_3$ and $R_4$ are selected from the group consisting of hydrocarbon radicals having from 1 to 8 carbon atoms or hydrogen with at least one of $R_3$ and $R_4$ not being hydrogen and $n$ is 1 to 4.

4 Claims, No Drawings

EMULSION POLYMERIZATION OF CHLOROPRENE IN THE PRESENCE OF A POLYSULFIDE MODIFIER

This application is a division of Ser. No. 541,237, filed Jan. 15, 1975, now U.S. Pat. No. 3,923,763 which is a continuation-in-part of Ser. No. 289,521, filed Sept. 15, 1972, now abandoned.

It has been known to polymerize chloroprene in the presence of sulfur compounds as polymerization modifiers. Mercaptan compounds have been extensively employed as polymerization modifiers. Early patents for the polymerization of hydrocarbon derivatives and copolymers such as the polymerization of butadiene with styrene suggested that sulfur compounds could be employed with the invention being that a combination of a mercaptan and a xanthogen compound is used. For example U.S. Pat. Nos. 2,401,346 and 2,416,440 have examples of the polymerization of butadiene-1,3 and styrene with bis(isopropyl xanthogen) and cetyl mercaptan and bisisopropoxythione)cyano monosulfide with a mixture of mercaptans of about 18 carbon atoms. Chloroprene has been polymerized with dialkyl xanthogen disulfide compounds as modifiers as is illustrated by U.S. Pat. Nos. 2,321,693; 2,567,117; 3,190,865; 3,300,433; 3,317,451; 3,392,134; 3,397,173; 3,444,153; 3,472,828; 3,507,825 and 3,655,827 and British Pat. Nos. 858,444; 905,971 and 952,156.

According to this invention chloroprene is polymerized in the presence of compounds of the formula

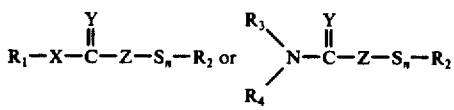

where X, Y and Z are selected from the group consisting of oxygen and sulfur, $R_1$ is a hydrocarbon radical having from 1 to 8 carbon atoms, $R_2$ is a hydrocarbon radical having from 1 to 8 carbon atoms or is a radical the same as

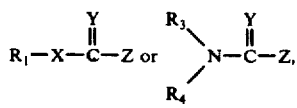

$R_3$ and $R_4$ are selected from the group consisting of hydrocarbon radicals having from 1 to 8 carbon atoms or hydrogen with at least one of $R_3$ and $R_4$ not being hydrogen and $n$ is 1 to 4. Compounds of this type may be formed, e.g., as disclosed in Twiss, W. D. JACS 49, Feb. 1927, p. 491–494. For convenience these compounds will be referred to as the sulfur modifiers in this application.

According to this invention polymers of chloroprene, 2-chloro-1,3 butadiene, are polymerized using the sulfur modifiers as a polymerization modifier. The term "polymers of chloroprene" encompasses polymers in which chloroprene is the major or predominant monomer. Comonomers may also be employed such as 2,3-dichloro-1, 3-butadiene; acrylonitrile, methyl methacrylate and so forth. Usually, the total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization and recovery of chloroprene are disclosed, for example, in Encyclopedia of Polymer Science and Technology, Vol. 3, page 705–730 (Interscience, 1965) and in numerous patents such as U.S. Pat. Nos. 2,264,173 and 2,264,191 both issued on Nov. 25, 1941. The polymerization may be conducted either batch or continuously.

Conventional emulsifiers may be employed such as the salts of rosins and rosin derivatives such as wood rosin, disproportionated rosin or hydrogenated rosin; ammonium, sodium or potassium salts of long chain fatty acids; nonionic surface active agents such as the ethylene oxide or propylene oxide condensation products of compounds containing reactive hydrogen atoms. Additional emulsifying agents are disclosed in U.S. Pat. No. 2,264,173. In this specification rosin or rosinates include the various commercial rosins, the dehydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731-S).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bis-isobutyronitrile and the like. Suitable inorganic peroxides are such as inorganic per acids including per sulfates, perborates or percarbonates, e.g., ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight on the total weight of the composition.

The sulfur modifier may be fed during polymerization. The only requirement is that the sulfur modifier be present for polymerization modification. However, it is usually preferred to add at least the predominant portion of the sulfur modifier to the initial polymerization charge. Although the amount of sulfur modifier is not critical certain proportions have been discovered to give superior results and within the range if from about 0.05 to 5 parts by weight of the sulfur modifier per 100 parts of polymerizable monomers are usually employed with a preferred range being from about 0.2 to 1.5 parts per 100 parts of monomer.

Other modifiers or other agents may be present in the emulsion. For instance, the polymerization may be carried out in the presence of sulfur to produce a sulfur modified polychloroprene. Also, chain transfer agents may be employed such as the alkyl mercaptans, e.g., dodecyl mercaptan, iodoform and benzyl iodide. However, compounds which will interfere with the proper functioning of the sulfur modifier should be avoided and thus the modifier may consist essentially of the sulfur modifiers of this invention. At any rate preferably the modifiers will be predominately by weight of the sulfur modifier compounds of this invention.

Normally, the polymerization would be conducted in an oxygen free or substantially oxygen free atmosphere such as use of an inert gas. However, in some processes a controlled amount of oxygen is employed.

The degree of polymerization and characteristics of the polymer can be controlled as is known in the art. The production of either benzene soluble or benzene insoluble polymers is within the scope of this invention. Suitable ranges for the percent of monomer conversion are such as between 60 and 90 percent conversion. The products can be employed to produce easy processing blends such as disclosed in U.S. Pat. No. 3,655,827 with the modifiers of this invention being used in preparation of either the sol or gel polymers or both but preferably in the preparation of the sol portion of the blend. If the sols are so modified with the sulfur modifiers a preferred range of modifier is from .10 to 3 weight parts per 100 parts of total monomer.

The temperature of polymerization may be varied depending upon the particular type of polymer being employed with suitable ranges being from 0° to 90° C. with the preferred range being between 15° and 55° C. The polymerization may be short stopped by the addition of agents such as paratertiary-butyl catechol and thiodiphenylamine. The process of polymerization may be either continuous or may be conducted in batch.

Examples of compounds which are useful as modifier according to this invention are di(O-ethyl thionothiolcarbonoxy) sulfide, di(O-ethyl thionothiolcarboxy) disulfide, isopropyl O-ethyl thionothiolcarbonoxy disulfide and so forth. In the compounds of the formula

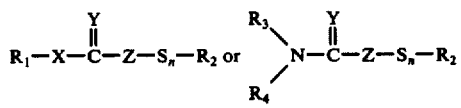

$R_1$ is a hydrocarbon radical of from 1 to 8 carbon atoms and $R_2$, $R_3$ and $R_4$ can be hydrocarbon radicals of from 1 to 8 carbon atoms or as defined above. The hydrocarbon radicals can be acyclic, cycloaliphatic, aromatic or combinations thereof. For example, the radicals can be methyl, ethyl, n-propyl, isopropyl, n-butyl, isobutyl, n-pentyl, 2-ethyl hexyl, cycloaliphatic radicals having 5 or 6 carbons, aryl radicals such as phenyl, alkaryl radicals such as methylphenyl, combinations thereof and so forth.

The polychloroprenes produced utilizing the modifiers of this invention can be cured and compounded by a variety of agents and means. The processing and compounding of polychloroprenes is discussed in the Encyclopedia of Polymer Science and Technology, Vol. 3, p. 724-730 (Interscience 1965) and J. C. Carl, Neoprene Latex, 1962, which references are incorporated by reference. Accelerators may be such as thioreas, amines, guanidine, thiazole, thiuram sulfides, thiocarbonates, organic acids, sulfur and the like.

It has been discovered that chloroprene polymers produced with the modifiers of this invention have excellent properties including high tensile strength and modulus properties. The polymers also have excellent aging stability and can exhibit excellent characteristics as measured by die swell, easy processing, controllable Mooney Viscosities, cure rate, elongation, crystallization rate, oil resistance and the like. The polymers can be used for a variety of applications either as a latex or as a recovered polymer including such applications as for dipped goods, adhesives, coatings, non-woven fabrics, bonded fibers, treated paper, sealants, foam, thread, carpet backing, hoses, gaskets, elasticized concrete and other known uses of polychloroprenes.

The sulfur modifiers of this invention can be substituted in equal weights for the xanthogen disulfide modifiers in the processes and products as disclosed in U.S. Pat. Nos. 2,567,117; 3,190,865; 3,300,433; 3,317,451; 3,392,134; 3,397,173; 3,444,152; 3,472,828; 3,507,825; 3,655,827; 3,686,156; Ger. Offen. No. 2,150,156 (U.S. application Ser. No. 78,932 filed Oct. 7, 1970) which references are herein incorporated by reference.

In the Examples all parts are by weight unless expressed otherwise. These examples are only illustrative of the invention.

EXAMPLE 1

The polymerizations are run in a 5 liter glass autoclave equipped with a paddle agitator. The charge is based on 100 parts of chloroprene which is 2000 grams.

| Polymerization Charge | Conc. in Parts by Weight |
|---|---|
| Chloroprene | 100 |
| 2,6-ditertiary-butyl para-cresol | 0.1 |
| Resin-731S* | 3.047 |
| Deionized Water | 100 |
| Sodium hydroxide (100 percent) | 0.54 |
| Modifier | As indicated |
| Sodium Sulfite | 0.30 |
| Sodium Salt of Sulfated Oleic Acid | 0.75 |
| Initial Catalyst | |
| Potassium Persulfate | 0.35 |
| Silver Salt | 0.07 |
| Deionized Water | 99.6 |

*A disproportionated wood rosin, purified by distillation and sold by Hercules Powder Co.

PUMPED CATALYST

A catalyst solution of the same composition as the initial catalyst is pumped as required to maintain the polymerization rate.

The polymerization is carried out under a nitrogen blanket at a temperature of 40° C. At 69 percent conversion the reaction is short-stopped with an emulsion containing 0.02 parts 4-t-butyl catechol, 0.02 parts pheno-thiazine, 0.8 parts chloroprene, 0.02 parts sodium dodecyl benzene sulfonate, and 0.8 parts deionized water. The latex is steam stripped of unreacted monomer and the resulting latex mixture is acidified to a pH of 6.3 using a 10% acetic acid solution and isolated by freeze roll.

Example 1 is a comparative example utilizing n-dodecyl mercaptan as the modifier. Example is a comparative example utilizing diisopropyl xanthogen disulfide as the modifier. Examples 3 and 4 illustrate the present invention.

| Example | Modifier [1] | Raw Mooney |
|---|---|---|
| | | (ML1+2½) |
| 1 | n-Dodecyl mercaptan | 50.5/47 |
| 2 | Diisopropyl xanthogen disulfide | 50/47 |
| 3 | Di-(O-ethyl dithiocarbonoxy) sulfide | 54.5/50 |
| 4 | Di-(O-ethyl dithiocarbonoxy) disulfide | 55.5/51 |

Samples of the isolated polymers are compounded using the following recipe:

| Components | Parts by Weight |
|---|---|
| Polymer | 100 |
| Stearic Acid | 0.5 |
| Magnesium Oxide | 4 |
| Zinc Oxide | 5 |
| Phenyl-α-Naphthylamine | 2 |
| GPF Carbon Black | 29 |
| Accelerator | 2.5 of TA11 or CRA as indicated |

[1] The modifier levels are varied to produce polymer with comparable Mooney values.

Samples are cured for 20 minutes at 307° F and give the following properties:

| Example | Accelerator | Modulus at % elongation, psi 200 | 300 | 400 | tensile strength, psi | Elongation % |
|---|---|---|---|---|---|---|
| 1 | CRA[2] | 1120 | 2200 | 3060 | 3140 | 410 |
| 2 | CRA | 1320 | 2440 | — | 3230 | 390 |
| 3 | CRA | 1400 | 2580 | — | 3300 | 380 |
| 4 | CRA | 1430 | 2630 | — | 3340 | 380 |
| 1 | TA-11[3] | 750 | 1380 | 1930 | 3170 | 640 |
| 2 | TA-11 | 950 | 1770 | 2600 | 3430 | 550 |
| 3 | TA-11 | 1230 | 2210 | 3060 | 3530 | 470 |
| 4 | TA-11 | 1180 | 2190 | 3070 | 3470 | 470 |

[2] CRA is ethylene thiourea which is Pennac CRA produced by Penwalt Corp.
[3] TA-11 is a treated amine accelerator produced by E. I. Du Pont.

Examples 3 and 4 illustrate that the modifiers of this invention give higher modulus and tensile strength as compared to polymers produced with mercaptans or dialkyl xanthogen disulfides.

EXAMPLE 5

The apparatus and procedure of Example 1 is used with the noted changes. The modifier is n-propyl(o-ethyl dithiocarbonoxy) sulfide. The charge is based on 100 parts of chloroprene which is 2000 grams.

| Polymerization Charge | Conc. in Parts by Weight |
|---|---|
| Chloroprene | 100.0 |
| 2,6-ditertiary-butyl para-cresol | 0.1 |
| Resin-731S* | 3.047 |
| Deionized Water | 100.0 |
| Sodium hydroxide (100 percent) | 0.57 |
| Modifier | 2.0 |
| Sodium Sulfite | 0.30 |
| Sodium Salt of Condensate of formaldehyde and Naphthalenesulfonic Acid (Lomar PW) | 0.7 |
| Initial Catalyst | |
| Potassium Persulfate | 4.500 |
| Silver Salt | 0.115 |
| Deionized Water | 95.4 |

A catalyst solution of the same composition as the initial catalyst is pumped as required to maintain the polymerization rate.

The polymerization is carried out under a nitrogen blanket at a temperature of 40° C and is short stopped and recovered as in Example 1.

The recovered polymer is loaded with carbon black and cured with ethylene thiourea to give a high tensile strength product.

EXAMPLE 6

The apparatus and procedure of Example 1 is used with the noted changes. The modifier is di-(N,N-diethyl dithiocarbamyl)-disulfide. The charge is based on 100 parts of chloroprene which is 1000 grams.

| Polymerization Charge | Conc. in Parts by Weight |
|---|---|
| Chloroprene | 100.0 |
| 2,6-ditertiary-butyl para-cresol | 0.1 |
| Resin-731S* | 3.047 |
| Deionized Water | 100.0 |
| Sodium hydroxide (100 percent) | 0.57 |
| Modifier | 1.0 |
| Sodium Sulfite | 0.30 |
| Lomar PW | 0.70 |
| Initial Catalyst | |
| Potassium Persulfate | 4.500 |
| Silver Salt | .115 |
| Deionized Water | 95.4 |

PUMPED CATALYST

A catalyst solution of the same composition as the initial catalyst is pumped as required to maintain the polymerization rate.

The polymerization is carried out under a nitrogen blanket at a temperature of 40° C and is short stopped and recovered as in Example 1.

The polymer produced is compounded in a gum stock formulation with an ethylenethiourea cure system to produce a high tensile strength material.

EXAMPLES 7 TO 13

The procedure of Example 3 is repeated with the substitution of the indicated modifier for the modifier of Example 3 on an equal molar weight.

| Example | Modifier |
|---|---|
| 7 | $CH_3-CH_2-O-\overset{S}{\underset{\parallel}{C}}-S_4-\overset{S}{\underset{\parallel}{C}}-CH_2-CH_2-CH_3$ |
| 8 | $CH_3-CH_2-S-\overset{S}{\underset{\parallel}{C}}-S_3-\overset{S}{\underset{\parallel}{C}}-S-CH_2-CH_3$ |
| 9 | $\text{Ph}-O-\overset{S}{\underset{\parallel}{C}}-S_4-\overset{S}{\underset{\parallel}{C}}-O-\text{Ph}$ |
| 10 | $CH_3-CH_2-O-\overset{O}{\underset{\parallel}{C}}-S_4-\overset{O}{\underset{\parallel}{C}}-O-CH_2-CH_3$ |
| 11 | $CH_3-CH_2-O-\overset{S}{\underset{\parallel}{C}}-S_3-\text{C}_6\text{H}_4-O-CH_3$ |
| 12 | $CH_3-CH(CH_3)-CH_2-O-\overset{O}{\underset{\parallel}{C}}-S_3-\overset{O}{\underset{\parallel}{C}}-CH_2-CH(CH_3)-CH_3$ |
| 13 | $CH_3-CH_2-O-\overset{S}{\underset{\parallel}{C}}-S_5-CH_2-CH_3$ |

EXAMPLE 14

The procedure and apparatus of Example 1 is utilized with the noted exceptions. The modifier is di-(O-isopropyl dithiocarbonoxy)-sulfide. The charge is based on 100 parts of chloroprene which is 2000 grams.

| Polymerization Charge | Conc. in Parts by Weight |
|---|---|
| Chloroprene | 100 |
| 2,6-ditertiary-butyl para-cresol | 0.1 |
| Resin-731S | 3.047 |
| Deionized Water | 100 |
| Sodium hydroxide (100 percent) | 0.57 |
| Modifier | 0.76 |
| Sodium Sulfite | 0.30 |
| Lomar PW | 0.7 |
| Initial Catalyst | |
| Potassium Persulfate | 0.35 |
| Silver Salt | 0.07 |
| Deionized Water | 99.6 |

PUMPED CATALYST

A catalyst solution of the same composition as the initial catalyst is pumped as required to maintain the polymerization rate.

The polymerization is carried out under a nitrogen blanket at a temperature of 40° C. At 69 percent conversion the reaction is short-stopped and recovered as in Example 1. The recovered polymer is cured with ethylene thiourea to give the results in the Table. One of the advantages of this modifier is that it produces a polymer having unexpectedly high Mooney scorch time as compared to closely related materials.

TABLE

| Raw Mooney ML 2½ + 4 | Aged Mooney 3 Day | Mooney Scorch minutes | Shore A HaRD-NESS | Modulus, psi 200% | Modulus, psi 300% | Tensile Strength psi | % Elongation | Minimum Torque inch lbs. | Scorch minutes | Torque at 30 minutes (T30) inch lbs. | Optimum Torque | Optimum Time |
|---|---|---|---|---|---|---|---|---|---|---|---|---|
| 40.5/37.0 | 40.5/38.0 | 11.0 | 60.5 | 1300 | 2470 | 3300 | 385 | 12.5 | 2.0 | 53.1 | 49.0 | 17.7 |

The compounds of the examples are only illustrative of the invention. The R groups of the structural formulas listed in the specification may be substituted with non-hydrocarbon radicals which do not interfere with the modification process. For example, in some instances radicals such as halogen, hydroxyl and/or nitrate groups may be present. However, the hydrocarbon compounds are preferred. Also preferred are the compounds of the formula

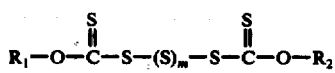

wherein m is 1 to 4, $R_1$ and $R_2$ are independently selected hydrocarbon radicals having 1 to 8 carbon atoms, particularly preferred compounds are those of the formula

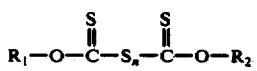

wherein n is 3 or 4, $R_1$ and $R_2$ are hydrocarbon radicals, but the two R groups do not necessarily have to be the same. Particularly preferred are compounds where R is isopropyl such as di-(O-isopropyl dithiocarbonoxy)-sulfide.

The invention claimed is:

1. A process for the emulsion polymerization of chloroprene which comprises polymerizing polymerizable monomer, consisting essentially of chloroprene and less than 15 mol percent of a comonomer, in the presence of from about 0.05 to 5 parts by weight per 100 parts of polymerizable monomer of a modifier having the formula

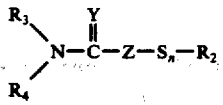

and mixtures thereof wherein $R_2$ is a hydrocarbon radical having from 1 to 8 carbon atoms or is a radical the same as

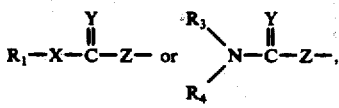

$R_3$ and $R_4$ are selected from the group consisting of hydrocarbon radicals having from 1 to 8 carbons or hydrogen with at least one of $R_3$ and $R_4$ not being hydrogen, X, Y and Z are selected from the group consisting of oxygen and sulfur, $R_1$ is a hydrocarbon radical having from 1 to 8 carbon atoms, and n is 1 to 4.

2. The process of claim 1 wherein the said modifier has a formula

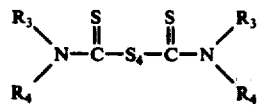

wherein $R_3$ and $R_4$ are selected from the group consisting of hydrogen and hydrocarbon radicals having from one to 4 carbon atoms and at least one of the $R_3$ and $R_4$ radicals on each nitrogen is one of the said hydrocarbon radicals.

3. The process of claim 1 wherein when $R_1$ and $R_2$ are hydrocarbon radicals having from 1 to 4 carbon atoms.

4. The process according to claim 2 wherein $R_3$ and $R_4$ are ethyl.

* * * * *